United States Patent [19]

Orth, Jr.

[11] 4,328,024

[45] * May 4, 1982

[54] SLOW-RELEASE NITROGEN FERTILIZER EMPLOYING WASTE PROTEINACEOUS ANIMAL FOOD AND METHOD OF MAKING AND USE

[75] Inventor: George O. Orth, Jr., Seattle, Wash.

[73] Assignee: Puget Sound Salmon Egg Co., Seattle, Wash.

[ * ] Notice: The portion of the term of this patent subsequent to Jun. 3, 1997, has been disclaimed.

[21] Appl. No.: 142,153

[22] Filed: Apr. 21, 1980

Related U.S. Application Data

[63] Continuation-in-part of Ser. No. 885,626, Mar. 13, 1978, Pat. No. 4,206,236.

[51] Int. Cl.$^3$ ................................................ C05F 1/00
[52] U.S. Cl. .......................................... 71/15; 71/16; 71/17; 71/22; 71/30
[58] Field of Search ................. 426/1, 321.2, 330, 331, 426/332, 532, 574, 641, 643, 647, 646, 805; 71/15, 16, 17, 22, 30, 54, 58, 63, 28

[56] References Cited

U.S. PATENT DOCUMENTS

| | | | |
|---|---|---|---|
| 1,608,688 | 11/1926 | Williamson | 426/1 |
| 3,102,804 | 9/1963 | Engelhart | 71/17 |
| 3,623,884 | 11/1971 | Haas | 426/335 X |
| 3,846,557 | 11/1974 | Mulla et al. | 426/1 |
| 3,873,736 | 3/1975 | Palmer et al. | 426/332 X |
| 3,876,803 | 4/1975 | Stephan et al. | 426/1 |
| 3,901,976 | 8/1975 | Roth et al. | 426/423 X |

*Primary Examiner*—Robert A. Yoncoskie
*Attorney, Agent, or Firm*—Seed, Berry, Vernon & Baynham

[57] ABSTRACT

A slow-release nitrogen fertilizer is disclosed employing proteinaceous animal food materials which are stabilized against decomposition and decay for extended periods of time when stored at ambient temperatures. The treated animal food materials are useful as fertilizer compositions, as food supplements or as bait for fish and crustaceans, such as crab. The animal food material is comminuted together to a finely divided state of the consistency of a thick soup with at least 4% by weight, based on the weight of the animal food material, of a polyol having from 2 to 8 carbon atoms and 2 to 6 hydroxyl groups. Edible polyols are used when the end product is to be used as a bait or food supplement. Antioxidants and/or mold inhibitors are also preferably added to the animal food material/polyol mixture. The mixture is further stabilized against decay for extended periods of time when stored at ambient temperatures by incorporating into the mixture a sufficient amount of attapulgus clay to dehydrate the animal food material/polyol mixture. The resulting mixture may be extruded into a shaped form or used in granular form.

11 Claims, No Drawings

SLOW-RELEASE NITROGEN FERTILIZER EMPLOYING WASTE PROTEINACEOUS ANIMAL FOOD AND METHOD OF MAKING AND USE

CROSS-REFERENCE TO RELATED APPLICATION

This is a continuation-in-part application of Ser. No. 885,626 filed Mar. 13, 1978 now U.S. Pat. No. 4,206,236, entitled "Method of Preserving Waste Proteinaceous Animal Food Materials for Use as Bait for Crustaceans."

BACKGROUND OF THE INVENTION

1. Field of the Invention

This invention relates to a method of preserving waste proteinaceous animal food materials and keeping them stabilized against decomposition and decay for extended periods of time when stored at room temperature and their use as a slow-release nitrogen fertilizer.

2. Description of the Prior Art

Fish waste; i.e., cannery wastes, have traditionally been disposed of by direct discharge into the nearest water body. New laws and regulations now prohibit this; however, canneries are currently allowed to collect their fish wastes, chop them and dispose of them by dumping into the ocean at required distances from shore. This is a costly disposal method and not entirely satisfactory. For one thing, the fish wastes cannot be stored for any length of time because of their rapid decay, which causes terrific odor problems, requiring land burial for disposal, which is even more costly than disposal in the ocean. There remains a need for a convenient way to utilize fish wastes for a useful purpose which, at the same time, will solve the waste disposal problem associated therewith.

Glycols are known to inhibit decay in proteinaceous materials such as fish wastes. U.S. Pat. No. 2,693,417 describes the use of glycol to preserve fish bait and herring. U.S. Pat. No. 3,904,774 discloses treating food and fish fillets with edible glycols to dehydrate and preserve the food and/or fish fillets. Before cooking, the glycol is washed from the treated food.

Fish fertilizer is generally manufactured as a liquid concentrate or as fish meal. Both forms have two disadvantages: odor and very rapid release of the nitrogen content of the composition when introduced into the soil. The rapid release of nitrogen results in short-lived effect of the fertilizer and, therefore, frequent applications are necessary. Care must also be used to prevent "burning" of the plants being fertilized by over-application. Odor is developed rapidly when these products are moistened for use. Synthetic slow-release nitrogen fertilizers, such as urea, are available; however, they are not natural products which contain many of the trace elements found in fish fertilizers.

SUMMARY OF THE INVENTION

It is a primary object of this invention to provide a method of preserving waste proteinaceous animal food materials.

It is a further object of this invention to provide a method of preserving and retaining waste proteinaceous animal food materials stable against decay and decomposition for extended periods of time when stored at an ambient temperature.

It is a further object of this invention to provide a method of making a liquid fertilizer composition or pelletized fertilizer compound from proteinaceous animal food materials.

It is another object of this invention to provide a slow-release nitrogen fertilizer composition which is easy to use, not odoriferous, and remains stable for long periods of time without decay prior to use.

These and other objects are accomplished by comminuting the animal food material together with at least 4% by weight, based on the weight of the animal food material, of a polyol. The food material is comminuted to a particle size generally no greater than 0.05 inch to form a thick soupy material which can be used as is as a fertilizer or as an animal food supplement. Anti-oxidants and/or mold inhibitors may be added to the animal food material/polyol mixture. To further stabilize the animal food material against decay and odor when stored at ambient temperatures for substantial periods of time, the animal food material/polyol mixture is blended with a sufficient amount of attapulgus clay to dehydrate the animal food material/polyol mixture. The resulting mixture, a stiff putty-like material, may be extruded into a shaped form. When placed on or in the soil, the nitrogen content of the composition is slowly released for plant use.

DETAILED DESCRIPTION OF THE PREFERRED EMBODIMENTS

"Proteinaceous animal food materials," as used herein, means wastes, such as the wastes of crustaceans, bivalves and finned fish, including shrimp, crabs, lobster, clams and oysters; and blood and meat wastes from fish, cattle, swine, sheep, goats, poultry, horses and other mammals.

By the method of the present invention, the animal food material is blended with at least 4% by weight, based on the weight of the animal food material, of a polyol having from 2 to 6 carbon atoms and 2 to 6 hydroxyl groups together with anti-oxidants and/or mold inhibitors. The mixture is then run through a grinder which comminutes the mixture to a particle size no greater than 0.05 inch. The resulting mixture has a consistency of a thick soup. The material may be used as is as a liquid fertilizer or processed as described hereafter to make a stable, marketable product for commercial or home use.

The polyols which can be used include non-edible glycols such as ethylene glycol and diethylene glycol, and edible glycols such as triethylene glycol, tetra-ethylene glycol, propylene glycol, dipropylene glycol, mixtures thereof or polyols such as glucose, sucrose, sorbitol, mannitol, etc.

Anti-oxidants which may be added include the conventional anti-oxidants added to food materials, such as BHT (butylated hydroxytoluene). Mold inhibitors, such as the methyl, ethyl, propyl and butyl esters of para-hydroxybenzoic acid esters, may also be added.

The animal food material may be ground to finely divided form separately and then blended with the polyol. A preferred polyol is propylene glycol, which is added to the animal food material in amounts of at least 4% to 30% by weight, based on the weight of the animal food material. Amounts less than about 4% by weight do not give sufficient preservative action of the animal food material.

The animal food material/polyol mixture described above is further protected against decay and decomposition by blending the mixture with a sufficient amount of attapulgus clay to form either a flowable granular product or a puttylike mixture which can be extruded into a desired shape. Attapulgus clay exerts a preservative action when blended in sufficient amounts with the animal food material having no polyol added thereto. Anti-oxidants and mold inhibitors must be added, however. A sufficient quantity of attapulgus clay to dehydrate the animal food material and inhibit decay should be used.

By blending the animal food material/polyol mixture with a sufficient amount of attapulgus clay to produce a putty-like material which is extrudible into a shaped form, a fertilizer composition is produced which is stable at ambient temperatures for at least six months and stable indefinitely under cold storage. The shaped product has the odor of fresh fish, clams or other proteinaceous water, whichever material is used as the proteinaceous animal food material in the bait. Attapulgus clay has the property of adsorbing the animal food material/polyol mixture and forming a stiff putty-like mixture which is extrudible into a soft shaped pellet. The pellets retain their shape when pressed and do not stick together. Preferred attapulgus clays include those commercially sold under the tradenames "Attagel-40," "Attagel-50" and "Attagel-350" by Engelhard Minerals and Chemicals Corporation. The proteinaceous animal food material/polyol mixture, when blended with sufficient attapulgus clay to produce a consistency of material which is extrudible, can be extruded by conventional means into any desired shape. Attapulgus clay offers greater absorption and enables the desired plasticity and adhesiveness of the final product to be obtained. Other clays, such as bentonite and kaolin clay, do not have the properties of attapulgus clay.

When the composition is placed in or on the soil, the nitrogen content of the composition is slowly released. To vary the rate of dissolution of the pellets, the amount of attapulgus clay used is varied. Generally, the amount of clay used ranges from 10% to 40% by weight, based on the weight of the animal food material/polyol mixture. An increase in clay content in the mixture decreases the period of dissolution of the pellets. Conversely, a decrease in the amount of clay used increases the rate of dissolution of the pellets.

If desired, additional amounts of attapulgus clay over that necessary to produce an extrudible mixture can be added to the animal food material/polyol mixture to produce a flowable granular material which is stable against decomposition and decay for extended periods of time; i.e., as much as six months or more.

If a higher nitrogen, phosphorus or potassium content of the fertilizer is desired, supplemental additives may be incorporated. Ground crab shells are highly satisfactory because of their slow-release nitrogen characteristics. Other additives may include synthetic nitrogen-containing compounds such as urea, ammonium nitrate, ammonium sulfate, water soluble calcium salts, bone meal, phosphorous compounds, potassium salts and trace minerals.

The following examples are illustrative of the methods described herein but are not intended to be limiting.

EXAMPLE 1

Whole fresh or frozen herring was ground through a food grinder and then through a Moorehouse paint mill to a particle size of less than 0.05 inch together with 12% by weight propylene glycol, based on the weight of the herring, and 0.01 wt. % butylated hydroxytoluene was added as an antioxidant. The resulting animal food material/propylene glycol mixture had the consistency of a thick soup with the particle size of the wastes no larger than about 0.05 inch. The soupy liquid was mixed with 30% by weight, based on the weight of the food material/propylene glycol mixture, of Attagel-50 and was extruded through a food grinder, having a 3/16-inch hole size in the plate to produce cylindrical pellets 3/16 inch in diameter and ¼ to ½-inch long. The pellets were placed on the soil around indoor plants for slow release of the nitrogen content of the pelletized composition.

EXAMPLE 2

Clams and squid were comminuted in a like manner as in Example 1 with propylene glycol and then treated with Attagel-50 to make pellets which were used for fertilizer purposes.

EXAMPLE 3

Salmon eggs were ground in a like manner as described with regard to Example 1 and blended with 15% by weight propylene glycol and then further blended with 35%–40% Attagel-50, and 0.01% BHT was added to stabilize the oils contained in the salmon eggs. The mixture was extruded into pellets of the same type as described with regard to Example 1.

I claim:

1. A method of making a slow-release nitrogen fertilizer composition which is stable against decay and decomposition at ambient temperatures for extended periods of time, comprising:
   comminuting a waste proteinaceous animal food material to a particle size of not greater than 0.05 inch,
   blending a polyol having from 2 to 8 carbon atoms and 2 to 6 hydroxyl groups, which acts as a preservative for the animal food material with the food material, the polyol constituting 4% to 30% by weight, based on the weight of the food material, and
   intimately blending with the food material/polyol mixture at least 10% to 40% by weight, based on the weight of the food material/polyol mixture, of attapulgus clay.

2. The method according to claim 1 wherein the polyol is one selected from the group consisting of sucrose, glucose, sorbitol, mannitol and mixtures thereof.

3. The method according to claim 1 wherein the polyol is an edible glycol selected from the group consisting of propylene glycol, triethylene glycol, tetraethylene glycol, dipropylene glycol and mixtures thereof.

4. The method of claim 1 wherein the polyol is propylene glycol.

5. The method of claim 1 wherein the food material is selected from the group consisting of fish wastes, salmon eggs, blood waste and meat wastes from the flesh of mammals.

6. A slow-release nitrogen fertilizing composition comprising:
   a waste proteinaceous animal food material comminuted to a particle size of not greater than 0.05 inches blended with (1) a polyol having from 2 to 8 carbon atoms and 2 to 6 hydroxyl groups, the polyol acting as a preservative and constituting from 4% to 30% by weight, based on the weight of the animal food material, and (2) at least 10% to 40% by weight, based on the weight of the animal food material/polyol mixture, of attapulgus clay.

7. The composition of claim 6 wherein the polyol is one selected from the group consisting of propylene glycol, triethylene glycol, tetra-ethylene glycol, dipropylene glycol and mixtures thereof.

8. The composition of claim 6, including ground crab shells.

9. The composition of claim 8, including bone meal.

10. The composition of claim 6, including a nitrogen-containing supplement selected from the group consisting of urea, ammonium nitrate and ammonium sulfate.

11. The composition of claim 6, including trace minerals.

* * * * *